US009573579B2

(12) United States Patent
Johri et al.

(10) Patent No.: US 9,573,579 B2
(45) Date of Patent: Feb. 21, 2017

(54) METHODS AND SYSTEM FOR TRANSITIONING BETWEEN CONTROL MODES WHILE CREEPING

(71) Applicant: Ford Global Technologies, LLC, Dearborn, MI (US)

(72) Inventors: Rajit Johri, Ann Arbor, MI (US); Francis Thomas Connolly, Ann Arbor, MI (US); Wei Liang, Farmington Hills, MI (US); Bernard D. Nefcy, Novi, MI (US); Xiaoyong Wang, Novi, MI (US); Mark Steven Yamazaki, Canton, MI (US); Ming Lang Kuang, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 14/447,101

(22) Filed: Jul. 30, 2014

(65) Prior Publication Data
US 2016/0031431 A1   Feb. 4, 2016

(51) Int. Cl.
| | | |
|---|---|---|
| *B60W 30/00* | (2006.01) | |
| *B60W 10/02* | (2006.01) | |
| *B60W 10/06* | (2006.01) | |
| *B60W 10/08* | (2006.01) | |
| *B60W 20/00* | (2016.01) | |
| *B60W 30/18* | (2012.01) | |

(52) U.S. Cl.
CPC ............ *B60W 10/026* (2013.01); *B60W 10/06* (2013.01); *B60W 10/08* (2013.01); *B60W 20/108* (2013.01); *B60W 30/18063* (2013.01); *B60W 2510/0233* (2013.01); *Y02T 10/6286* (2013.01); *Y10S 903/93* (2013.01)

(58) Field of Classification Search
CPC .............................................. B60W 30/18063
See application file for complete search history.

(56) References Cited

U.S. PATENT DOCUMENTS

| | | | | |
|---|---|---|---|---|
| 2006/0293149 | A1* | 12/2006 | Landes ............... | B60W 10/026 477/181 |
| 2008/0032856 | A1* | 2/2008 | Gohring ................... | B60K 6/48 477/5 |
| 2013/0310219 | A1 | 11/2013 | Whitney et al. | |
| 2013/0311055 | A1 | 11/2013 | Whitney et al. | |
| 2014/0031158 | A1* | 1/2014 | Hemphill .............. | B60W 20/10 475/5 |
| 2014/0163787 | A1* | 6/2014 | Gibson ................. | B60W 20/40 701/22 |
| 2014/0224060 | A1* | 8/2014 | Murata ................. | F16F 15/126 74/574.4 |

* cited by examiner

*Primary Examiner* — Tisha Lewis
(74) *Attorney, Agent, or Firm* — David Kelley; Alleman Hall McCoy Russell & Tuttle LLP

(57) ABSTRACT

Systems and methods for transitioning a torque source between speed control and torque control modes during a vehicle creep mode are disclosed. In one example, torque of an electric machine is adjusted in response to a torque converter model. The torque converter model provides for a locked or unlocked torque converter clutch.

10 Claims, 4 Drawing Sheets

METHODS AND SYSTEM FOR TRANSITIONING BETWEEN CONTROL MODES WHILE CREEPING

FIELD

The present description relates to methods and a system for transitioning a torque source between speed control and torque control modes while operating a vehicle in a creep mode. The methods may be particularly useful for hybrid vehicles that include an electric motor and an engine.

BACKGROUND AND SUMMARY

A hybrid vehicle may include an engine and an electric machine to provide torque to propel the vehicle. The electric machine may operate more smoothly at low speeds as compared to the engine. Therefore, it may be desirable to operate the hybrid vehicle in an electric only mode where the electric machine is the sole torque source when the vehicle is operated at low speeds. One operating mode where vehicle speed is low is creep mode. Creep mode may be a mode where driver demand torque is zero or a small torque less than a threshold torque, vehicle speed is less than a threshold speed, and vehicle brakes are not applied. During creep mode, a torque source (e.g., an engine and/or an electric machine) may supply a small amount of torque to allow the vehicle to creep at a slow speed (e.g., less than 8 KPH) or to hold the vehicle stationary on a small positive incline. It may be desirable to transition the torque source between speed control mode and torque control mode while the vehicle is in creep mode based on vehicle operating conditions. However, if torque from the torque source is not supplied smoothly in the transition from speed control mode to torque control mode, a driver may experience undesirable vehicle motion while the vehicle is creeping. Consequently, the driver may not experience smooth vehicle motion during creep.

The inventors herein have recognized the above-mentioned disadvantages and have developed a driveline method, comprising: adjusting torque of a torque source in response to a virtual torque converter impeller speed when a torque converter clutch is locked.

By adjusting torque output of a torque source in response to a virtual torque converter impeller speed, it may be possible to provide the technical result of improving transitions of the torque source from speed control mode to torque control mode during a vehicle creep mode. For example, an electric machine may be a torque source for a hybrid vehicle. The electric machine may be operated in a speed control mode while a vehicle is in a creep mode and while a torque converter clutch of a torque converter receiving torque from the electric machine is in an open state. The electric machine may be transitioned from the speed control mode to a torque control mode when the torque converter clutch is locked during the vehicle creep mode to improve driveline efficiency. Electric machine torque may be adjusted during the transition based on a virtual torque converter impeller speed. The virtual torque converter impeller speed is an input into a torque converter model that outputs torque converter impeller torque. The electric machine torque is adjusted to maintain the torque converter impeller torque so that driveline torque disturbances may be reduced.

The present description may provide several advantages. Specifically, the approach may improve driveline speed control mode to torque control mode transitions. Further, the approach may provide for reduced driveline torque disturbances. Further still, the approach may reduce degradation of driveline components.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
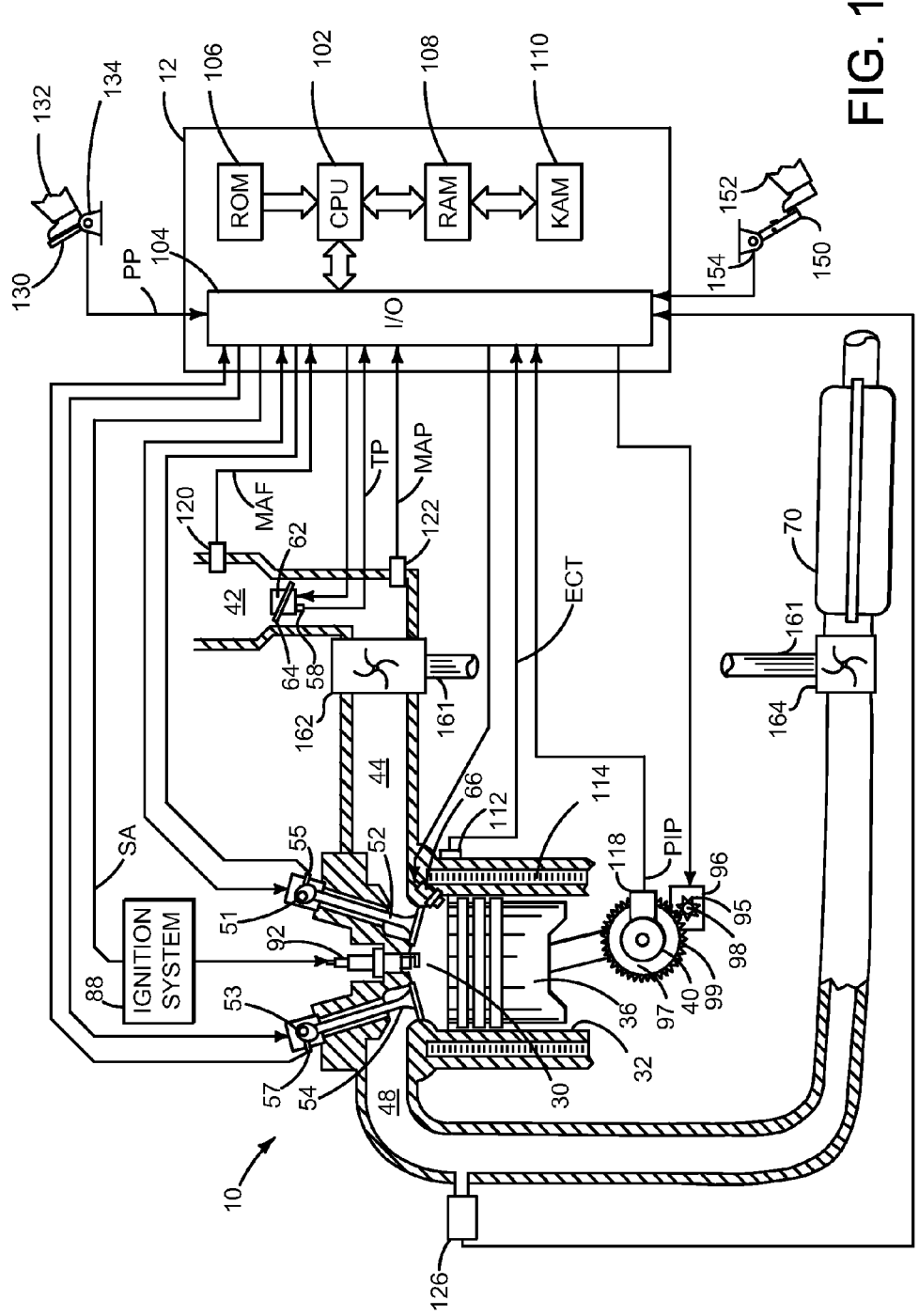
FIG. 1 is a schematic diagram of an engine.
Figure 2:
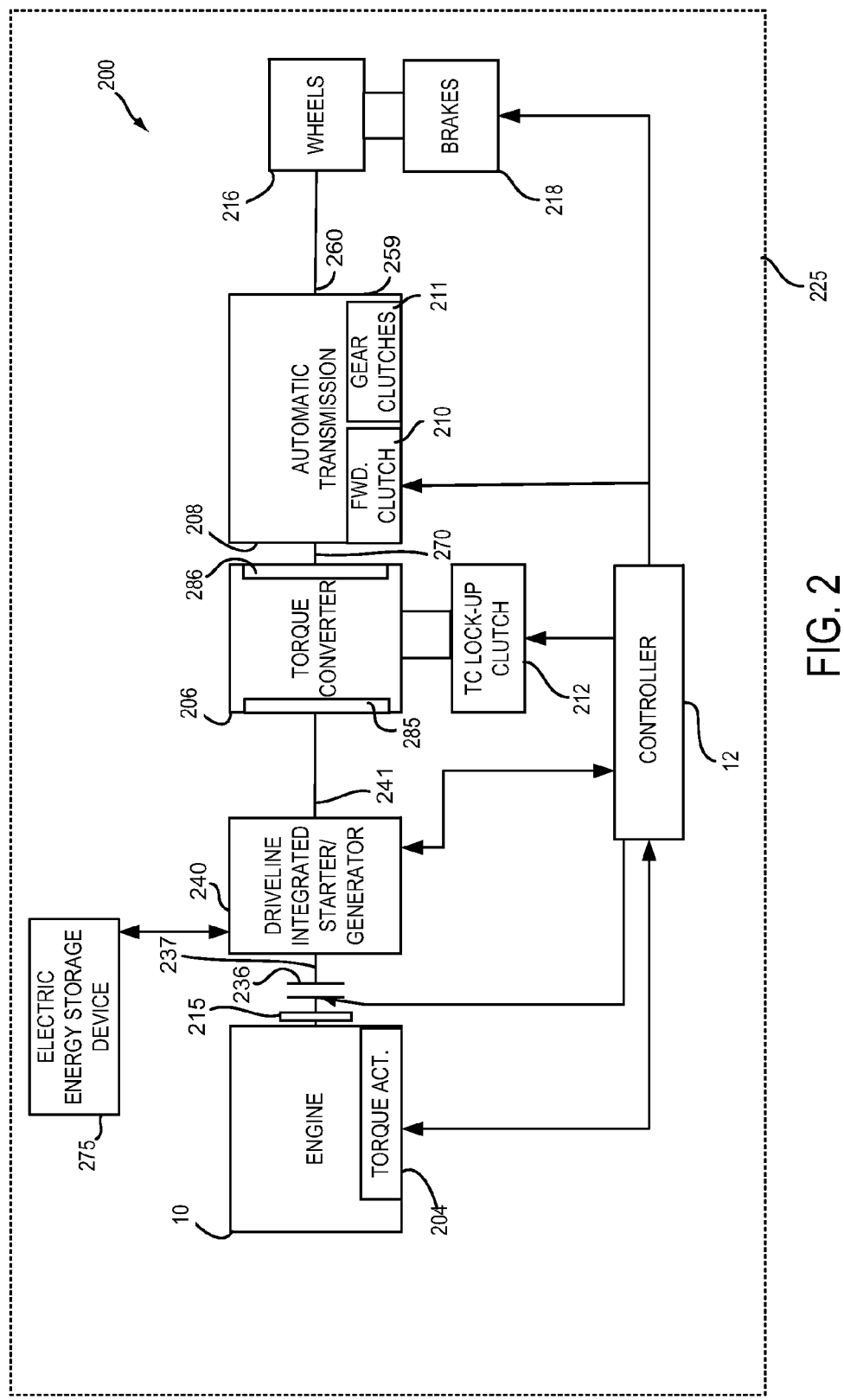
FIG. 2 shows an example vehicle driveline configuration.
Figure 3:
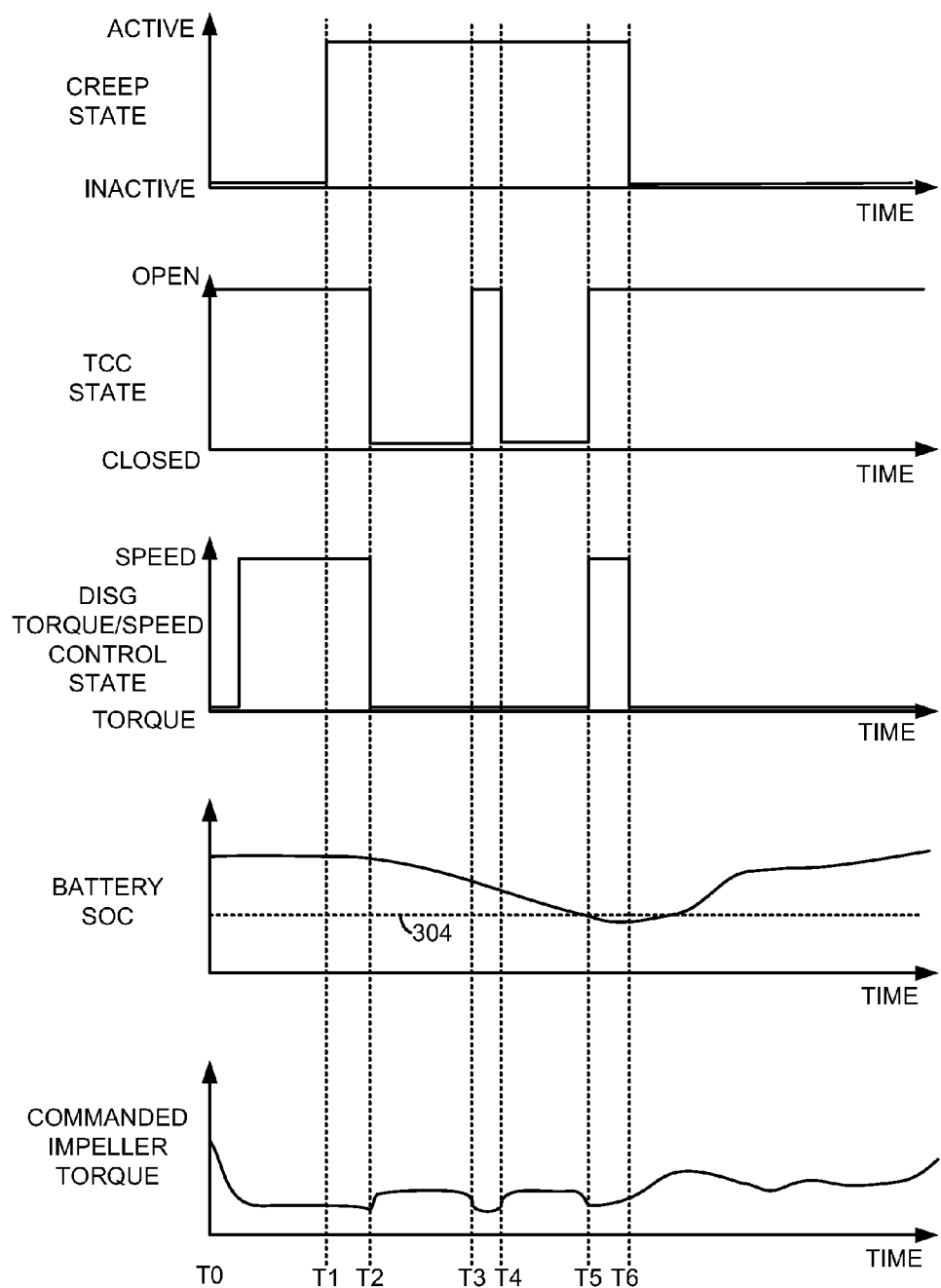
FIG. 3 shows an example creep mode operating sequence.

The present description is related to improving transitioning between speed control mode and torque control mode while operating a vehicle in a creep mode. Creep mode may be entered during conditions of low vehicle speed when vehicle brakes are not applied and when driver demand torque is low. Creep mode may be provided in a hybrid vehicle as shown in FIG. 2. The hybrid vehicle may include an engine as is shown in FIG. 1. If the vehicle is operating in a creep mode and a request to change from speed control to torque control is made, the motor or engine torque command may be smoothed as is shown in FIG. 3. Mode transitions from a speed control mode to a torque control mode while operating in creep mode may be provided according to the method of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Thus, the system of FIGS. 1 and 2 provides for a driveline system, comprising: an engine; an electric machine; a transmission mechanically coupled to the electric machine, the transmission including a torque converter with a torque converter clutch; and a controller including executable instructions stored in non-transitory memory for adjusting torque of the engine or the electric machine in response to a virtual torque converter impeller speed different from an actual torque converter impeller speed. The driveline system includes where the virtual torque converter speed is based on operating conditions of the engine. The driveline system includes where the virtual torque converter speed is based on operating conditions of the electric machine. The driveline system also includes where the operating condition is a battery state of charge. The driveline system includes where the virtual torque converter impeller speed is determined when the torque converter clutch is locked. The driveline system includes where the torque of the engine or the electric machine is adjusted in further response to a torque converter model.

Referring now to FIG. 3, an example hybrid vehicle creep mode operating sequence including mode transitions between speed control mode and torque control mode is shown. The sequence of FIG. 3 may be provided by the system of FIGS. 1 and 2 executing the method of FIG. 4. In this example, the engine is not operating while the vehicle is in creep mode and is decoupled from the driveline. However, the engine may be operated in other examples.

The first plot from the top of FIG. 3 is a plot of creep state versus time. The vehicle is in a creep mode when the creep state trace is at a higher level near the Y axis arrow. The vehicle is not in a creep mode when the creep trace is at a lower level near the X axis. The Y axis represents the creep state. The X axis represents time and time increases from the left side of FIG. 3 to the right side of FIG. 3.

The second plot from the top of FIG. 3 is a plot of torque converter clutch (TCC) state versus time. The Y axis represents TCC state. The TCC is open when the TCC state trace is near the Y axis arrow and closed when the TCC state trace is near the X axis. The X axis represents time and time increases from the left side of FIG. 3 to the right side of FIG. 3.

The third plot from the top of FIG. 3 is a plot of DISG torque or speed control mode state versus time. The Y axis represents DISG torque or speed control state versus time. The DISG is operating in a speed control mode when the trace is near the Y axis arrow. The DISG is operating in torque control mode when the trace is near the X axis. The X axis represents time and time increases from the left side of FIG. 3 to the right side of FIG. 3.

The fourth plot from the top of FIG. 3 is a plot of battery state of charge (SOC) versus time. The Y axis represents battery SOC state. The SOC is at a high level when the trace is near the Y axis arrow. The SOC is at a low level when the trace is near the X axis arrow. The X axis represents time and time increases from the left side of FIG. 3 to the right side of FIG. 3. The horizontal line 304 represents a low SOC threshold.

The fifth plot from the top of FIG. 3 is a plot of commanded torque converter impeller torque versus time. In one example, torque converter impeller torque may be based on driver demand torque as determined from accelerator pedal position and vehicle speed. The Y axis represents commanded torque converter impeller torque. The X axis represents time and time increases from the left side of FIG. 3 to the right side of FIG. 3.

At time T0, the vehicle is not in creep mode as indicated by the creep state trace being at a low level. The TCC is in an open state and the DISG is in a torque control mode. The battery SOC is at a higher level and the commanded torque converter impeller torque is being reduced from a higher level to a lower level. Such conditions may be indicative of a decelerating vehicle.

At time T1, the vehicle enters a creep mode. Creep mode may be entered when driver demand torque is less than a threshold torque (e.g., zero), vehicle speed is less than a threshold speed, and when vehicle brakes are not applied. The TCC state remains open and the DISG is operating in speed control mode. The open TCC allows the DISG to operate in speed control mode so that the DISG may operate near a desired engine idle speed in case the engine is restarted and recoupled to the DISG. The battery SOC is at a higher level and the commanded torque converter impeller torque is relatively low.

At time T2, the DISG transitions into a torque control mode and the torque converter clutch is locked. By locking the torque converter, the driveline may operate with higher efficiency. Further, the engine and/or DISG are not operated in speed control mode when the torque converter clutch is locked because of the vehicle's large inertia may interact with the speed controller resulting in undesirable driveline speed variation.

The DISG torque is shown being increased to maintain torque at the transmission input shaft since the torque converter torque multiplication feature is suppressed. The vehicle remains in a creep mode. The commanded torque converter impeller torque increases or decreases based on torque converter clutch state, the torque change is based on a virtual torque converter impeller speed. The torque converter impeller torque is filtered with a filter initialized to a value of the last commanded torque converter impeller torque provided during the DISG speed control mode.

At time T3, the DISG remains in torque control mode and the torque converter is unlocked in response to operating conditions (not shown). DISG torque is decreased to maintain a constant torque at the transmission input shaft because DISG torque is multiplied by the torque converter when the torque converter clutch is opened.

At time T4, the DISG remains in torque control mode and the torque converter clutch is locked in response to operating conditions (not shown). The torque converter is locked and the DISG torque is increased to maintain a constant torque at the transmission input shaft because DISG torque is not multiplied by the torque converter when the torque converter clutch is closed.

Between time T2 and time T5, the battery SOC is reduced as battery charge powers the DISG and provides creep torque. As battery SOC is reduced, the DISG loses capacity to meet future torque demands.

At time T5, the TCC is opened and the DISG transitions from torque control mode back to speed control mode in response to SOC being less than threshold 304. The commanded torque converter impeller torque is decreased as the DISG transitions into speed control mode. The DISG speed may be ramped to the new desired speed at a predetermined rate. In one example, the new desired speed is a desired engine idle speed. The TCC is also unlocked as the DISG transitions to speed control mode.

Between time T5 and time T6, the engine is started to provide torque to the driveline in the presence of low SOC. Further, the engine may be coupled to the DISG by closing the driveline disconnect clutch. The TCC remains open and the vehicle remains in creep mode.

At time T6, the DISG exits creep mode in response to an increase in driver demand torque (not shown). The commanded torque converter impeller torque also increases in response to the increasing drive demand torque. The engine (not shown) and DISG are coupled. The TCC is in an open state to improve vehicle launch feel.

In this way, a DISG operating in speed control mode while a vehicle is in creep mode may be transitioned into operating in a torque control mode without causing an undesirable driveline torque disturbance. Further, the driveline efficiency may be improved by locking the TCC during creep mode to reduce torque converter losses.

Figure 4:
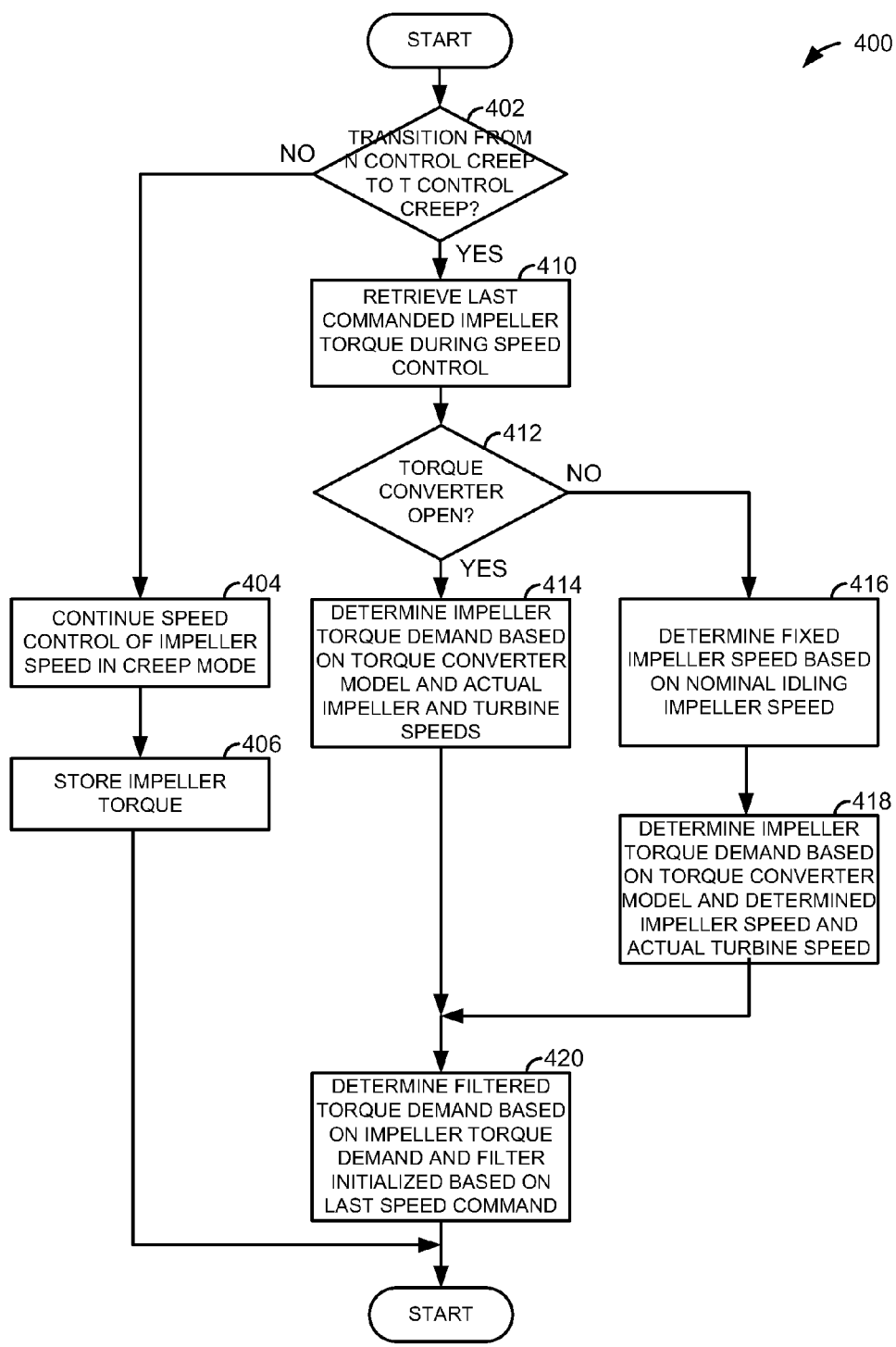
FIG. 4 shows an example method for operating a vehicle in creep mode.

Referring now to FIG. 4, a method for reducing the possibility of driveline torque disturbances during transitions between speed control mode and torque control mode while a vehicle is in creep mode is shown. The method of FIG. 4 may provide the operating sequence shown in FIG. 3. Additionally, the method of FIG. 4 may be included in the system of FIGS. 1 and 2 as executable instructions stored in non-transitory memory.

At 402, method 400 judges if there is a request to transition from speed (N) control to torque (T) control while the vehicle is in creep mode. The vehicle may be in creep mode when vehicle speed is less than a threshold speed (e.g., 8 KPH), driver demand is less than a threshold (e.g., less than 20 N-m), and when the brake pedal is not applied. In creep mode, a small amount of torque is supplied to the driveline so that the vehicle may be propelled at a low speed (e.g., 8 KPH) or hold vehicle position on a small positive incline. The engine and/or the DISG may be controlled in speed or torque control. During some conditions, the DISG may be the sole torque source to the driveline by disconnecting the engine from the driveline via the driveline disconnect clutch. During other conditions, the engine and the DISG may supply creep torque to the driveline. And, in still other conditions, the engine may be the sole torque provider to the driveline by deactivating the DISG.

In speed control mode, the engine and/or the DISG are closed loop controlled to a desired driveline speed while torque is allowed to vary. For example, an actual driveline speed is subtracted from a desired driveline speed producing a driveline speed error. The engine and/or DISG speed are adjusted based on the driveline speed error. In torque control mode, engine and/or DISG torque may be open loop or closed loop controlled to a desired torque converter impeller torque while speed is allowed to vary. For example, an actual torque converter impeller torque as measured or inferred is subtracted from a desired torque converter impeller torque producing a torque converter impeller torque error. The engine and/or DISG torque are adjusted based on the torque converter impeller torque error.

A transition from speed control mode to torque control mode may be initiated in response to closing a torque converter clutch to improve driveline efficiency. Further, a transition from speed control mode to torque control mode may be allowed or inhibited in response to other conditions such as engine temperature, ambient temperature, and road coefficient of friction. If method 400 judges to transition from speed control to torque control during creep mode, the answer is yes and method 400 proceeds to 410. Otherwise, the answer is no and method 400 proceeds to 404.

At 404, method 400 continues to operate the engine and/or DISG in speed control mode to control torque converter impeller speed. Engine and/or DISG torque are adjusted in speed control mode to rotate the driveline and torque converter impeller at a desired speed. The desired speed may be empirically determined and stored in memory. The desired driveline speed may be indexed via engine temperature, ambient temperature, DISG temperature, and/or other operating conditions. In one example, actual driveline speed is subtracted from desired driveline speed to produce a driveline speed error. The engine and/or DISG torque is adjusted to achieve the desired driveline speed. For example, if actual driveline speed is less than desired driveline speed, DISG torque is increased to increase driveline speed. DISG torque is increased via supplying additional current to the DISG. Likewise, engine torque may be increased via adjusting an engine torque actuator such as a throttle. Method 400 proceeds to 406 after continuing to operate the engine and/or DISG in speed control mode.

At 406, method stores the latest commanded torque converter impeller torque to memory. If the driveline is operating in electric machine only mode where the engine is not operating, the latest commanded torque converter impeller torque is the latest commanded DISG torque. If the driveline is operating in engine only mode where the electric machine is not operating, the latest commanded torque converter impeller torque is the latest commanded engine torque. If the driveline is operating with the engine and the DISG providing fractional amounts of the total torque, the latest commanded torque converter impeller torque is allocated to the engine and the DISG according to fraction of commanded torque converter impeller torque the engine and DISG are respectively allocated. The latest engine torque and DISG torque are stored to memory along with the latest torque converter. Method 400 proceeds to exit after the latest torque values are stored to memory.

At 410, method 400 retrieves the last commanded torque converter impeller torque $\tau_{spd}$ from 406 when the engine and/or DISG were operated in speed control mode. Additionally, the latest DISG and engine torques may also be retrieved from memory from when the engine and/or DISG were operated in speed control mode.

At 412, method 400 judges if the torque converter clutch is open. In one example, method 400 may judge that a torque converter clutch is open when a variable in memory takes on a predetermined value (e.g., 1). In other examples, method 400 may judge that a torque converter clutch is opened based on a pressure of a hydraulic line or a voltage or an electrical signal. If method 400 judges that the torque converter is open, the answer is yes and method 400 proceeds to 414. Otherwise, the answer is no and method 400 proceeds to 416.

At 414, method 400 determines torque converter impeller torque based on a torque converter model and actual torque converter impeller and turbine speeds. The torque converter impeller torque is determined so that the impeller torque applied when the engine and/or electric machine are in speed control mode is applied when the engine and/or electric machine are transitioned to torque control mode. By commanding the same amount of torque in torque control mode as was commanded in speed control mode, it may be possible to make transitions between speed and torque control modes more transparent to the driver. The torque converter impeller torque is determined from the following equation:

$$\tau_{TC} = \left(\frac{\omega_{imp}}{K(SR)}\right)^2$$

Where $\tau_{TC}$ is the torque converter impeller torque, K is the torque converter capacity factor, $\omega_{imp}$ is torque converter impeller speed, and SR is the torque converter speed ratio of torque converter impeller speed $\omega_{imp}$ to torque converter turbine speed $\omega_{tur}$. The torque converter K factor may be empirically determined and stored in memory in a table or function. Method 400 proceeds to 420 after the torque converter impeller torque is determined.

At 420, method 400 determines a final demand torque $\tau_{trq}$ that is filtered. In one example, the filter is a low pass filter of the form $\tau_{trq}=G_{(\tau_{TC})}$, where G is a low pass transfer function and where $G_0$ is $\tau_{spd}$. Thus, the low pass filter is seeded with the value $\tau_{spd}$ at the time engine and/or DISG control is transitioned from speed control mode to torque control mode. For example, in a discrete implementation, the final demand torque is given by $\tau_{trq}(i)=\alpha\cdot\tau_{TC}+(1-\alpha)\cdot\tau_{spd}$, where $\alpha$ is the low pass filter time constant. The final demand torque is delivered to the engine and/or DISG to supply the driveline torque during creep mode.

At 416, method 400 determines fixed torque converter impeller speed based on nominal torque converter impeller speed. The fixed torque converter impeller speed is a virtual torque converter impeller speed based on conditions when the torque converter clutch is not locked. Thus, the impeller speed when the torque converter is unlocked is the basis for determining the virtual torque converter impeller speed when the torque converter is locked. In one example, the virtual torque converter impeller speed $\omega'_{imp}$ is empirically determined based on nominal driveline idle conditions and stored in memory. For example, the virtual torque converter impeller speed may be 400 RPM when the electric machine is consuming X amperes of current while the driveline is idling and not being influenced by a driver demand torque. Alternatively, the virtual torque converter impeller speed may be 800 RPM when the amount of air inducted by the engine is Y Kg/second at a stoichiometric air-fuel ratio while the driveline is idling and not being influenced by a driver demand torque. Alternatively, the torque converter speed at driveline idling conditions may be determined from estimated engine torque by looking up the empirically determined torque converter impeller speed from memory based on engine torque during creep mode where the torque converter is unlocked. The virtual torque converter impeller speed may be determined via indexing tables and/or functions based on engine and/or electric machine operating conditions.

Nominal driveline idle conditions may include when the vehicle brake is not applied, and when the engine and/or electric machine are providing a predetermined amount of torque to the torque converter at predetermined operating conditions (e.g., a nominal barometric pressure and ambient temperature). Additionally, the virtual torque converter impeller speed may be adjusted based on changes from nominal engine spark timing, valve timing, ambient temperature, barometric pressure, and fuel type. For example, the virtual torque converter impeller speed is operated on by a multiplier that is adjusted based on conditions deviating from nominal conditions and the result is an adjusted virtual torque converter impeller speed. Method 400 proceeds to 418 after the virtual torque converter impeller speed is determined.

At 418, method 400 determines torque converter impeller torque based on a torque converter model and determined or virtual torque converter impeller speed and actual torque converter turbine speed. The torque converter impeller torque is a same torque as the torque converter turbine torque when the torque converter clutch is locked. The torque converter impeller torque for the locked torque converter is determined via the following equation:

$$\tau_{TC} = \left(\frac{\omega'_{imp}}{K(SR)}\right)^2 \cdot T_R(SR')$$

Where $\tau_{TC}$ is the torque converter impeller torque, $\omega_{imp}$ is a virtual torque converter impeller speed, K is the torque converter capacity factor, $T_R$ is torque ratio curve for the torque converter, and SR' is the torque converter speed ratio of virtual torque converter impeller speed $\omega_{imp}$ to torque converter turbine speed $\omega_{tur}$. The torque ratio curve $T_R$ may be empirically determined and stored to memory indexed by the torque converter speed ratio.

Thus, the torque converter impeller torque is determined based on a virtual torque converter impeller speed, not actual torque converter impeller speed, when the torque converter clutch is locked. The determined torque converter impeller torque includes adjustments for the loss of torque converter torque multiplication when the torque converter clutch is locked to provide a same wheel torque as when the torque converter is operated with an open torque converter clutch.

Thus, the method of FIG. 4 provides for a driveline method, comprising: adjusting torque of a torque source in response to a virtual torque converter impeller speed when a torque converter clutch is locked. The method includes where the torque source is a driveline integrated starter/generator. The method also includes where the torque source is an engine.

In some examples, the method includes where the virtual torque converter impeller speed is based on torque output of an engine when the torque converter clutch is unlocked. The method also includes where the virtual torque converter impeller speed is based on torque output of a driveline integrated starter/generator when the torque converter clutch is unlocked. The method further comprises adjusting the torque of the torque source in response to a speed ratio of the virtual torque converter impeller speed and actual torque converter turbine speed. The method further comprises adjusting the torque of the torque source in response to a torque ratio of a torque converter.

The method of FIG. 4 also provides for a driveline method, comprising: operating a torque source in a speed control mode during a vehicle creep mode while a clutch of a torque converter is open; and transitioning operating the torque source from the speed control mode to a torque control mode and locking the clutch during the vehicle creep mode in response to a vehicle operating condition. The method further comprises adjusting torque of a torque source in response to a virtual torque converter impeller speed when a torque converter clutch is locked. The method includes where the virtual torque converter impeller speed is based on operating conditions of a driveline integrated starter/generator. The method also includes where the virtual torque converter impeller speed is based on operating conditions of an engine.

In some examples, the method further comprises adjusting torque of a torque source in response to torque converter impeller speed when a torque converter clutch is unlocked. The method further comprises adjusting torque of the torque source in the torque control mode in response to a filtered torque. The method includes where the filtered torque is based on a torque when the torque source operated in the speed control mode.

As will be appreciated by one of ordinary skill in the art, the methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline method, comprising:
    operating a torque source in a speed control mode during a vehicle creep mode while a clutch of a torque converter is open;
    transitioning operating the torque source from the speed control mode to a torque control mode and locking the clutch during the vehicle creep mode in response to a vehicle operating condition; and
    adjusting torque of the torque source in response to torque converter impeller speed when the torque converter clutch is unlocked.

2. The method of claim 1, further comprising adjusting torque of the torque source in response to a virtual torque converter impeller speed when the torque converter clutch is locked.

3. The method of claim 2, where the virtual torque converter impeller speed is based on operating conditions of a driveline integrated starter/generator.

4. The method of claim 2, where the virtual torque converter impeller speed is based on operating conditions of an engine.

5. The method of claim 1, further comprising adjusting torque of the torque source in the torque control mode in response to a filtered torque.

6. The method of claim 5, where the filtered torque is based on a torque when the torque source is operated in the speed control mode.

7. A driveline method, comprising:
    operating a torque source in a speed control mode during a vehicle creep mode while a clutch of a torque converter is open;
    transitioning operating the torque source from the speed control mode to a torque control mode and locking the clutch during the vehicle creep mode in response to a vehicle operating condition; and
    adjusting torque of the torque source in response to a virtual torque converter impeller speed when the torque converter clutch is locked.

8. The method of claim 7, where the virtual torque converter impeller speed is based on operating conditions of a driveline integrated starter/generator.

9. The method of claim 7, where the virtual torque converter impeller speed is based on operating conditions of an engine.

10. A driveline method, comprising:
    operating a torque source in a speed control mode during a vehicle creep mode while a clutch of a torque converter is open;
    transitioning operating the torque source from the speed control mode to a torque control mode and locking the clutch during the vehicle creep mode in response to a vehicle operating condition; and
    adjusting torque of the torque source in the torque control mode in response to a filtered torque, where the filtered torque is based on a torque when the torque source is operated in the speed control mode.

\* \* \* \* \*